(12) United States Patent
Swan

(10) Patent No.: US 7,246,216 B2
(45) Date of Patent: Jul. 17, 2007

(54) DYNAMIC PARTITIONING OF STORAGE MEDIA FOR MIXED APPLICATIONS

(75) Inventor: Paul R. Swan, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 449 days.

(21) Appl. No.: 10/891,393

(22) Filed: Jul. 14, 2004

(65) Prior Publication Data

US 2006/0015473 A1    Jan. 19, 2006

(51) Int. Cl.
*G06F 12/00*    (2006.01)

(52) U.S. Cl. ..................................... 711/173

(58) Field of Classification Search ............... 711/2, 711/153, 170, 173
See application file for complete search history.

(56) References Cited

U.S. PATENT DOCUMENTS

| | | | |
|---|---|---|---|
| 5,675,769 A * | 10/1997 | Ruff et al. ................. | 711/173 |
| 5,706,472 A * | 1/1998 | Ruff et al. ................. | 711/173 |
| 5,930,931 A * | 8/1999 | Watson ..................... | 711/173 |
| 6,253,300 B1 * | 6/2001 | Lawrence et al. .......... | 711/173 |
| 6,401,183 B1 | 6/2002 | Rafizadeh | |
| 2004/0019750 A1 | 1/2004 | Swan | |

FOREIGN PATENT DOCUMENTS

| | | |
|---|---|---|
| EP | 0028643 | 11/1980 |
| EP | 1040480 | 1/2000 |
| EP | 1122916 | 8/2001 |
| WO | WO 95/12165 | 5/1995 |
| WO | WO 97/10604 | 3/1997 |

OTHER PUBLICATIONS

Swan, Paul R., U.S. Appl. No. 10/167,172, filed Jun. 10, 2002, entitled "Seek Minimized Recoverable Streaming File System".

* cited by examiner

*Primary Examiner*—Jack A. Lane
(74) *Attorney, Agent, or Firm*—Christopher P. Maiorana PC

(57) ABSTRACT

An apparatus comprising a first partition and a second partition. The first partition has a first file system comprising (i) a plurality of first clusters configured to store data having accesses faster than a first worst case data transfer rate and (ii) a dedicated space not used by the plurality of first clusters. The second partition has a second file system comprising a plurality of second clusters (i) configured to store data having accesses faster than a second worst case data transfer rate and (ii) occupying the dedicated space.

19 Claims, 3 Drawing Sheets

DYNAMIC PARTITIONING OF STORAGE MEDIA FOR MIXED APPLICATIONS

FIELD OF THE INVENTION

The present invention relates to a data storage generally and, more particularly, to a method and/or apparatus for implementing dynamic partitioning of storage media for mixed applications.

BACKGROUND OF THE INVENTION

As multiple functions are combined within the same system, the storage media within such a system needs to support a more diverse spectrum of applications. This is especially true of home media devices such as personal video recorders and other devices that have constrained processor and memory resources. Other consumer products are also beginning to contain mass storage technology such as hard discs and optical discs. At least three basic application groups can be identified. Each group has different needs that need to be met by the same storage media. High data transfer rate applications, such as video playback and recording, have hard real time constraints. Medium data transfer rate applications, such as audio playback and recording, have hard real time constraints. Low data transfer rate applications, such as static graphic elements, mail/WWW data and other miscellaneous data, have soft real time constraints.

The number and size of the stored files associated with an application typically follows a related pattern (i) a small number of large size files (e.g., video programs), (ii) a medium number of medium size files (e.g., audio programs), and (iii) a large number of small size files (e.g., static graphic elements, mail/WWW data and other miscellaneous data). For efficient operation, each of these applications uses storage space on the media that needs to be managed by different file systems each optimized for the particular application.

Current storage management solutions from desktop PC and workstation environments partition storage space into one or more partitions. Each partition allocates a fixed portion of the total storage space dedicated to the applications of an associated file system. FIG. 1 illustrates such a partition configuration.

With the implementation shown in FIG. 1, a number of individual partitions (partition 1, partition 2 and partition 3) are each allocated to a different file system. The partitions 1–3 are typically fixed when the storage media is formatted/initialized. If an application using a particular one of the partitions 1–3 uses all of the storage space within the particular partition, the only way the size of the particular partition can be increased is by a re-partition and/or a re-format operation that effects all of the partitions in the system. Re-formatting is time consuming, results in loss of existing stored data and cannot be done while the partitions 1–3 are being used.

There are a number of conventional solutions to these problems. A single partition can be implemented with a general-purpose file system. However, such a general-purpose file system is not optimized for any particular application. Without optimization, such a file system operates inefficiently for one or more of these applications.

A single partition with a general-purpose file system can be implemented to bypass the file system after initialization by using the storage space directly. However, any bypassing of the file system must ensure that the integrity of the file system is not compromised and that synchronization is maintained.

A single partition with a general-purpose file system can be implemented that superimposes a second customized storage management method upon the file system. The superimposition of some other storage management solution to bolster the efficiency of the general purpose file system results in problems similar to fixed partitioning (e.g., the need to re-format and/or re-initialize the partition).

Multiple fixed partitions may be implemented to accept the space restrictions of each application as a system constraint. With such a system, the end user is exposed to an undesirable constraint in the operation of the product dependent on how each fixed partition is used in any particular circumstance.

It would be desirable to implement a method and/or apparatus for dynamically partitioning storage media to support mixed applications with diverse file systems.

SUMMARY OF THE INVENTION

The present invention concerns an apparatus comprising a first partition and a second partition. The first partition has a first file system comprising (i) a plurality of first clusters configured to store data having accesses faster than a first worst case data transfer rate and (ii) a dedicated space not used by the plurality of first clusters. The second partition has a second file system comprising a plurality of second clusters (i) configured to store data having accesses faster than a second worst case data transfer rate and (ii) occupying the dedicated space.

The objects, features and advantages of the present invention include providing a file system that may (i) provide multiple partitions, (ii) control the space in each partition in a hierachial fashion, (iii) allow any number of applications to use any number of optimized file systems all sharing the same storage space, (iv) bound the amount of space available to the applications of a particular file system (the partition size) by the total available free storage space, (v) implement intrinsic prioritization of the storage space (space and/or access) between a number of application file systems, (vi) provide cache amortization, and/or (vii) provide media defect management.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
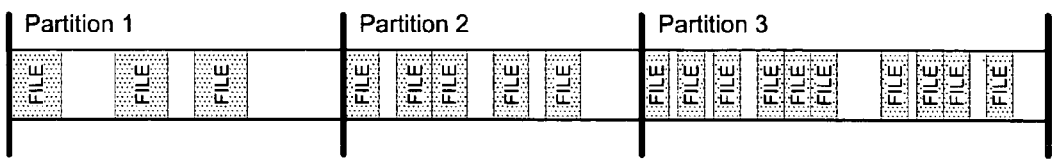
FIG. 1 is a diagram illustrating a conventional file system.
Figure 2:
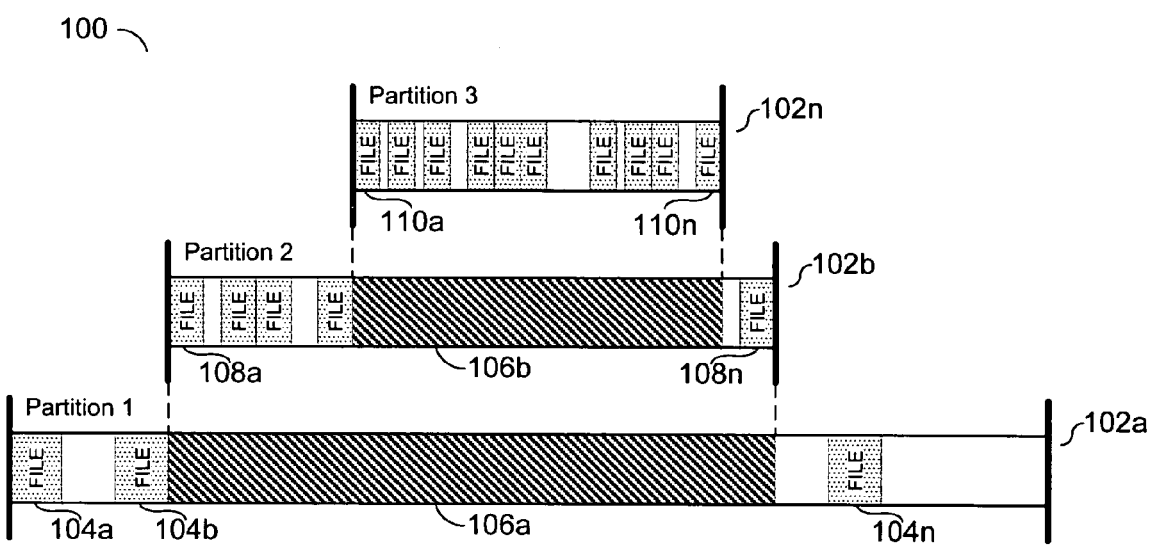
FIG. 2 is a diagram illustrating a partition hierarchy in accordance with the present invention.

Referring to FIG. 2, a diagram of a partition system 100 is shown. The system 100 generally comprises a number of partitions 102a–102n. Each of the partitions 102a–102n represents a portion of a storage device (or array of storage devices) that is dedicated to a particular file system. The system 100 may be used to implement dynamic partitioning to allow the partitions 100a–100n to easily change the space available as the applications in a particular file system requests more (or less) space than previously allocated. In the system 100, the storage space is partitioned hierarchically such that individual application file systems are logically "stacked" on top of one another in the order of a typical file size.

The lowest member of the hierarchy (e.g., the partition 102a) stores a number of files 104a–104n for the applications using the files having the largest sizes and highest data transfer rates. The partition 102a is shown having a dedicated portion 106a that is not used for storing the files 104a–104n. Rather, the dedicated portion 106a is used by the partition 102b. For purposes of the partition 102a, the dedicated portion 106a works like one of the files 104a–104n. For purposes of the partition 102b, the dedicated portion supports a file system separate from the file system of the partition 102a. The partition 102a is the only one of the partitions 102a–102n that initially has the entire storage space available. Subsequent partitions (e.g., 102b and 102n) initially have only a minimum of storage space available. The storage space for a particular partition (e.g., the partition 102n) is normally allocated by the partition shown below (e.g., the partition 102b). Each of the partitions 102a–102n normally contains an independent file system. By implementing independent file systems, operating characteristics such as cluster size, transfer speed, etc., may be optimized for a particular application. The partition 102b is shown having a number of files 108a–108n. The partition 102n is shown having a number of files 110a–110n. The particular number of partitions 102a–102n may be increased or decreased to meet the design criteria of a particular implementation.

An example of allocating the space available to the file system using the partition 102n is the dedicated space 106b allocated and managed by the file system using the partition 102b. The space available to the file system using the partition 102b is the dedicated space 106a allocated and managed by the file system using the partition 102a. The space available to the partition 102a is the entire storage space on the media. Since the space available to the partitions 102b and 102n is managed by another file system, there is no particular design criteria for such space to be physically contiguous. In particular, while FIG. 2 illustrates contiguous space for each of the partitions 102a–102n, non-contiguous space may be implemented to meet the design criteria of a particular implementation. Additionally, a number of dedicated portions 106a and 106b may be implemented at each level of the hierarchy. For example, the partition 102a may have a plurality of dedicated portions 106a each configured to support one of a plurality of the partitions 102b.

Figure 3:
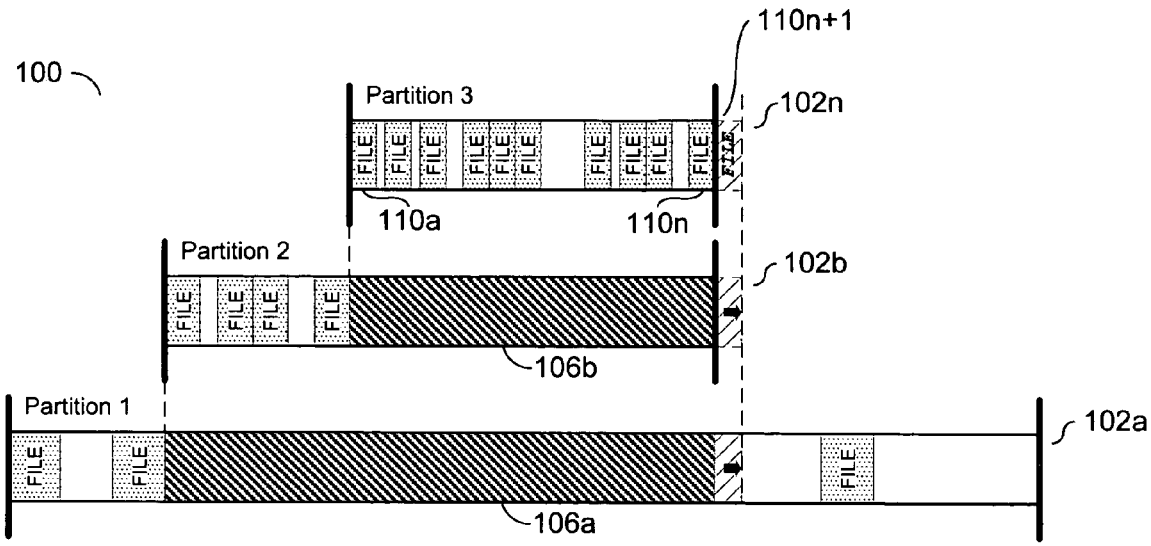
FIG. 3 is a diagram illustrating a downward propagation of a space expansion request.

Referring to FIG. 3, an example of the file system 100 is shown where the top of the hierarchy (e.g., the partition 102n) uses all of the initial space allocated. FIG. 3 illustrates a downward propagation of a space expansion request from the top file system 102n to the bottom file system 102a when a file 110n+1 needs to be written. The partition 102n requests an expansion of space from the file system of the partition 102b below. If the file system 102b has unused space available, then the file system 102b allocates some of that space for use by the file system 102n by increasing the dedicated space 106b. If the file system of the partition 102b does not have any unused space available, then a space expansion request is presented to the file system 102a. The file system of the partition 102a increases the size of the dedicated space 106a. Since the file system of the partition 102a is the lowest in the hierarchy, and uses all of the available space of the media, the file system of the partition 102a may not request more space.

Figure 4:
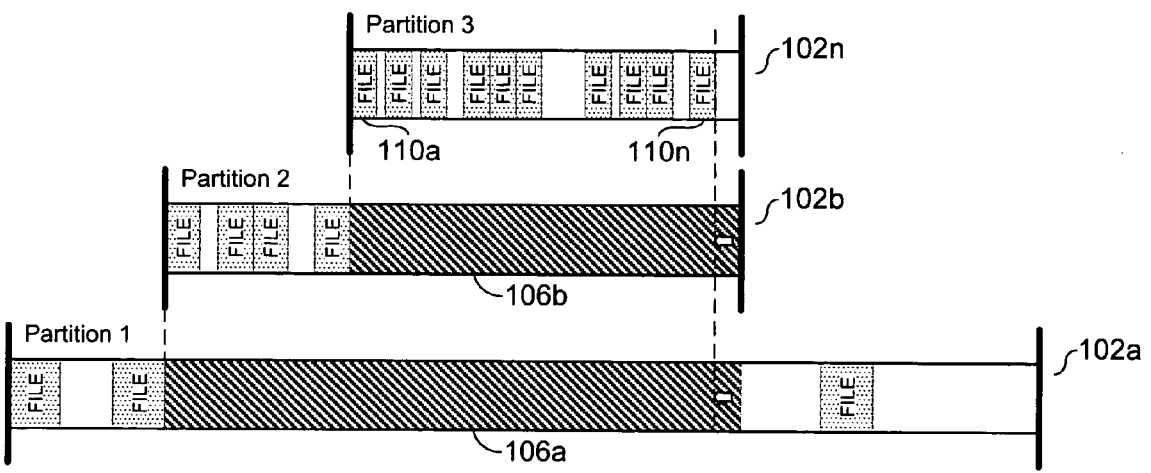
FIG. 4 is a diagram illustrating a downward propagation of a space contraction request.

Referring to FIG. 4, an example of the file system 100 is shown where the top partition 102n of the hierarchy is no longer using all of the space allocated. The partition 102n releases space back to the file system of the partition 102b below by requesting a contraction of the dedicated space 106b. FIG. 4 illustrates the downward propagation of a space contraction request from the top file system to the bottom file system. If the file system of the partition 102b has no use for the extra space, then the file system of the partition 102b propagates the contraction request to the file system of the partition 102n below, if there is a lower file system (e.g., when the file system of the partition 102b is not the lowest member of the hierarchy). The present invention may allow the partition size available to one of the file systems of one of the partitions 102a–102n of any particular application to be allocated and/or adjusted by another of the file system 102a–102n in the hierarchy.

Figure 5:
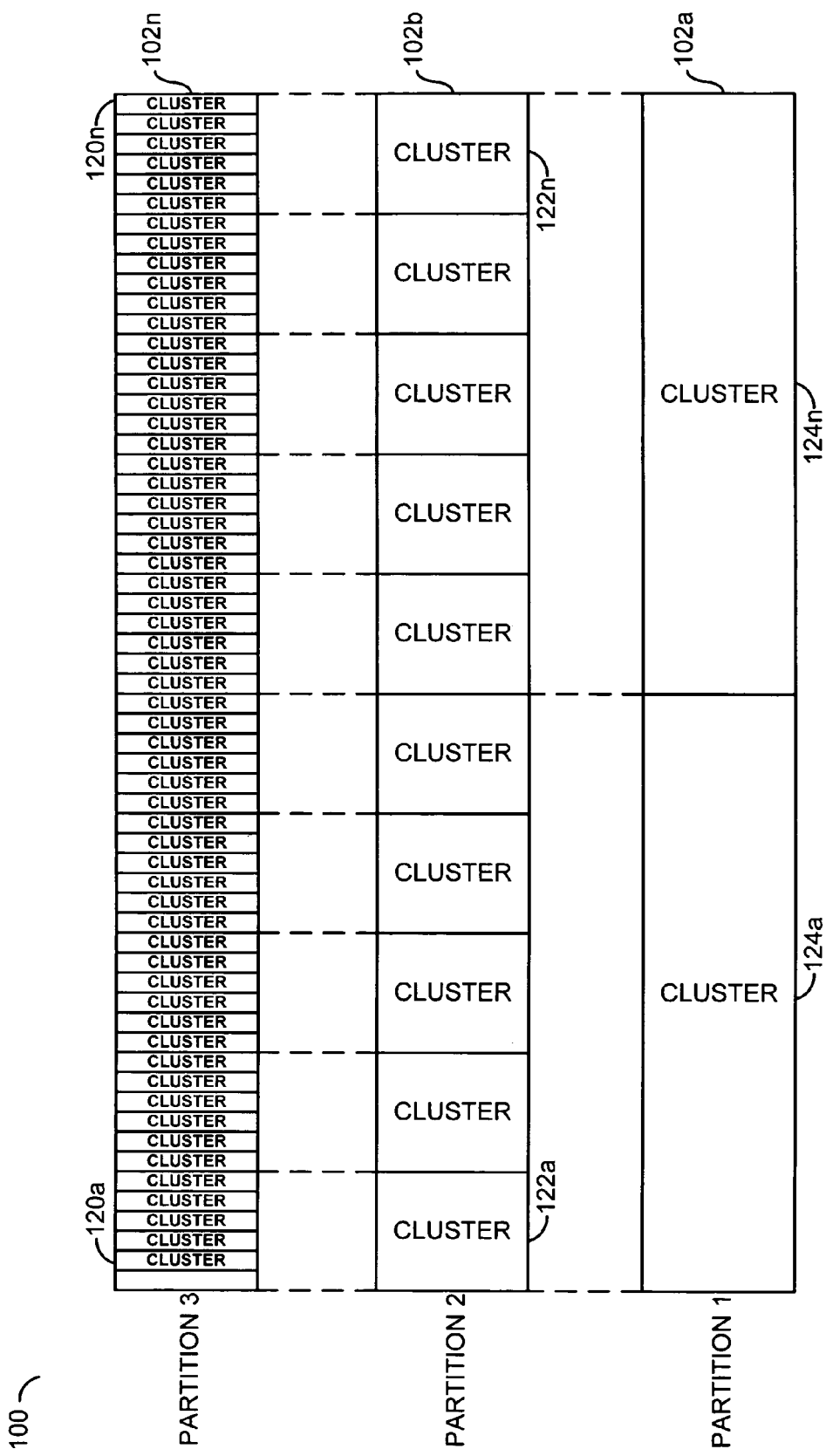
FIG. 5 is a diagram illustrating an implementation of a file system.

Referring to FIG. 5, a detailed implementation of the file system 100 is shown. File systems typically allocate space in minimum allocation units referred to as clusters. The file system of the partition 102a is shown having a number of clusters 120a–120n. The file system of the partition 102b is shown having a number of clusters 122a–122n. The file system of the partition 102n is shown having a number of clusters 124a–124n. The size of a particular cluster 120a–120n, 122a–122n and 124a–124n is chosen either arbitrarily, or based on a trade off between efficiency of space used and data transfer rate performance. For large files that need a high data transfer rate, a large cluster size (e.g., 10000 Kb–20000 Kb, more preferably 14000 Kb–18000 Kb, most preferably in the range of 1638 Kb) may be used to achieve the necessary performance. For small files in which transfer rate is not important, a small cluster size (e.g., 8 Kb–128 Kb, or in the range of 64 Kb and 16 Kb) may be used to achieve the necessary storage efficiency. A medium cluster size may be in the range of 512 Kb. Within each of the partitions 102a–102n, all of the clusters are generally the same size. For the implementation of dynamic partitioning, the partitions 1–3 may be stacked in order of underlying cluster size, with the largest cluster size at the bottom of the hierarchy and the smallest at the top.

The partition 102a may be optimized to be used for video files. Video storage typically involves the storage of hundreds of files. The programs typically have an average length of 30 minutes for a TV show to 2 hours for a movie. A 3 Mbit transfer rate for a low quality recording (or a 8 Mbit transfer rate for a high quality recording) normally results in file sizes in the range 640 Mb to 6.8 Gb.

The partition 102b may be used for camera JPEGS and MP3 files. Storage of such files typically involves the storage of tens of thousands of files having an average size in the range of 500 Kb to 4 Mb. MP3 files typically average about 2 Mb to 5 Mb per song.

The partition 102n may be implemented as a partition 3a and a partition 3b. The partition 3a may be used for internal video associated data. Thousands of files, in the range of 115 Kb for 30 minutes of video, may be stored. Editing such information may be done at a typical rate of 196 Kb. The partition 3b may be used for Electronic Program Guide (EPG) data. EPG data includes program listings and descriptions that are typically downloaded off-air, by modem, or as a private data stream in a satellite signal. Such storage typically involves the storage of thousands of files having a size predominantly around the 1 Kb to 32 Kb. Based on the above examples, an allocation unit of 16 Kb of the partition 3b would be too slow, due to fragmentation and file system overhead, to store 8 Mbit duplex video data stored in the partition 1. Conversely, the allocation unit of 16 Mb of partition 1 would be too inefficient a use of storage space with a 16 Mb allocation unit. Such an implementation may waste as much as 16 Gb of space. By optimizing the file systems of the partitions 102a–102n to store a particular type (or classification) of file, the present invention maximizes the use of resources. Each of the partitions 102a–102n typically supports data accesses faster than a worst case data transfer rate. The partition 102a may support a first worst case data transfer rate. The partition 102b may support a second worst case data transfer rate, etc.

The present invention may be particularly useful in consumer products that have constrained resources (e.g., memory size processor speed, etc). In such applications, the present invention may provide cache memory amortization and media defect management.

With cache memory amortization, a file data cache may be provided for the file system of the partition 102a. Such a file data cache also benefits the other hierachical partitions 102b–102n. The file systems of the hierachical partitions 102b–102n do not need separate large data caches since they can use the cache from the file system of the partition 102a. Such re-use of memory cache may be referred to as cache memory amortization, and may save memory and be more efficient by limiting the duplication of cache memory.

Media defect management may also be implemented since only the file system of the partition 102a directly accesses the storage media, implementing a single defect management system eliminates the need for defect management in the other hierachical partitions 102b–102n. Such a multiple use of defect management saves memory and resources.

With the hierarchy described, three or more further optimizations can be made to simplify the implementation of the file systems. Space extensions and contractions may be limited to multiples of the cluster size of the recipient file system. Space extensions and contractions may be limited to only be performed at the logical end of the partitioned space available to the file system.

The recipient file system manages the space allocated to other partitions as the other partitions were a file (e.g., "file system in a file"). This latter optimization allows for the support of multiple dynamically partitioned hierarchies utilizing the same storage space in a tree configuration (i.e. each file system uses only one space source but may provide space for multiple other file systems).

The file systems used with the present invention normally supports dynamic extension/contraction of managed space and are normally able to perform these operations efficiently while the file system is still in use by the application (e.g., transparently). An example of such a file system may be found in co-pending application Ser. No. 10/167,172, which is incorporated by reference in its entirety. The seek minimized recoverable streaming file system described in Ser. No. 10/167,172 may be extended to support the features of the present invention by the addition and subtraction of clusters to/from the cluster chains 120a–120n, 122a–122n and 124a–124n.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a first partition having a first file system comprising (i) a plurality of first clusters each configured to store data having accesses faster than a first worst case data transfer rate and (ii) a first dedicated space not used by said plurality of first clusters; and
   a second partition having a second file system comprising a plurality of second clusters (i) configured to store data having accesses faster than a second worst case data transfer rate and (ii) occupying said dedicated space.

2. The apparatus according to claim 1, wherein said second file system further comprises a second dedicated space.

3. The apparatus according to claim 1, further comprising:
   a third partition having a third file system comprising a third plurality of clusters (i) configured to store data having accesses faster than a third worst case data transfer rate (ii) occupying said second dedicated space.

4. The apparatus according to claim 1, wherein said first dedicated space is adjustable in response to a request from said second file system.

5. The apparatus according to claim 4, wherein said adjustment of said first dedicated space comprises (i) an increase of space or (ii) a decrease of space.

6. The apparatus according to claim 1, wherein said first worst case data transfer rate is optimized for a large number of small files.

7. The apparatus according to claim 6, wherein said optimization of said first worst case data transfer rate comprises implementing said first file system with a small cluster size.

8. The apparatus according to claim 1, wherein said second worst case data transfer rate is optimized for a small number of large files.

9. The apparatus according to claim 8, wherein said optimization of said second worst case data transfer rate comprises implementing said second file system with a large cluster size.

10. A method for dynamically partitioning a storage media device comprising the steps of:
    (A) generating a first partition having a first file system comprising (i) a plurality of first clusters each configured to store data having accesses faster than a first rate worst case data transfer and (ii) a first dedicated space not used by said plurality of first clusters; and
    (B) generating a second partition having a second file system comprising a plurality of second clusters (i) configured to store data having accesses faster than a second worst case data transfer rate and (ii) occupying said dedicated space.

11. The method according to claim 10, wherein said second file system further comprises a second dedicated space.

12. The method according to claim 10, further comprising:
    generating a third partition having a third file system comprising a third plurality of clusters (i) configured to store data having accesses faster than a third worst case data transfer rate (ii) occupying said second dedicated space.

13. The method according to claim 10, wherein said first dedicated space is adjustable in response to a request from said second file system.

14. The method according to claim 13, wherein said adjustment of said first dedicated space comprises (i) an increase of space or (ii) a decrease of space.

15. The method according to claim 10, wherein said first worst case data transfer rate is optimized for a large number of small files.

16. The method according to claim 15, wherein said optimization of said first worst case data transfer rate comprises implementing said first file system with a small cluster size.

17. The method according to claim 10, wherein said second worst case data transfer rate is optimized for a small number of large files.

18. The method according to claim 17, wherein said optimization of said second worst case data transfer rate comprises implementing said second file system with a large cluster size.

19. An apparatus comprising the steps of:

means for generating a first partition having a first file system comprising (i) a plurality of first clusters each configured to store data having accesses faster than a first worst rate data transfer rate and (ii) a first dedicated space not used by said plurality of first clusters; and means for generating a second partition having a second file system comprising a plurality of second clusters (i) configured to store data having accesses faster than a second worst case data transfer rate and (ii) occupying said dedicated space.

* * * * *